United States Patent [19]

Maeda et al.

[11] 3,899,047

[45] Aug. 12, 1975

[54] IMPACT ABSORBING DEVICE AND MOTOR VEHICLE BODY STRUCTURE INCORPORATING THE SAME

[75] Inventors: Teruo Maeda; Hideo Shimoe; Yasuhiko Fujiwara, all of Yokohama; Norimoto Aya, Tokyo; Nagayuki Marumo, Yokohama; Heigo Tsuji, Fujisawa; Yuzo Sakamoto, Yokosuka, all of Japan

[73] Assignee: Nissan Motor Company Limited, Yokohama, Japan

[22] Filed: Apr. 18, 1973

[21] Appl. No.: 352,229

[30] Foreign Application Priority Data

| | | |
|---|---|---|
| Apr. 19, 1972 | Japan | 47-39394 |
| Apr. 19, 1972 | Japan | 47-39396 |
| Apr. 19, 1972 | Japan | 47-39397 |
| Apr. 19, 1972 | Japan | 47-39398 |
| Apr. 22, 1972 | Japan | 47-40712 |
| Apr. 22, 1972 | Japan | 47-47916 |
| Aug. 29, 1972 | Japan | 47-100825 |

[52] U.S. Cl.................. 188/1 C; 293/70; 293/89
[51] Int. Cl. ........................................ B60r 19/02
[58] Field of Search ............ 188/1 C; 293/1, 70, 89, 293/DIG. 3; 213/1 A; 74/492, 493

[56] References Cited
UNITED STATES PATENTS

| | | | |
|---|---|---|---|
| 3,097,725 | 7/1963 | Peterson | 293/1 |
| 3,181,821 | 5/1965 | Webb | 188/1 C X |
| 3,308,908 | 3/1967 | Bunn | 188/1 C |
| 3,482,653 | 12/1969 | Maki et al. | 188/1 C |
| 3,504,568 | 4/1970 | Nakamura et al. | 188/1 C X |

*Primary Examiner*—M. Henson Wood, Jr.
*Assistant Examiner*—Andres Kashnikow

[57] ABSTRACT

An improved impact dampening device is herein disclosed, which comprises at least two elongated members which are telescopically connected to each other so as to be plastically deformed when they are forced to longitudinally move relative to each other in response to an impact applied thereto. The dampening device may be used as part of a motor vehicle body structure so that the body structure is at least partly collapsed in a fore-and-aft direction when the motor vehicle encounters a collision at the front or rear end of the vehicle body.

13 Claims, 37 Drawing Figures

Fig. 17d
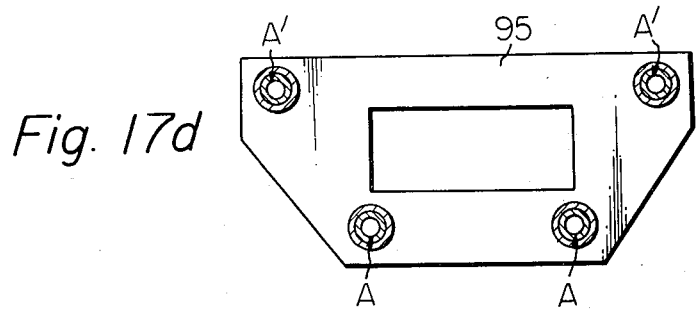
Fig. 17e
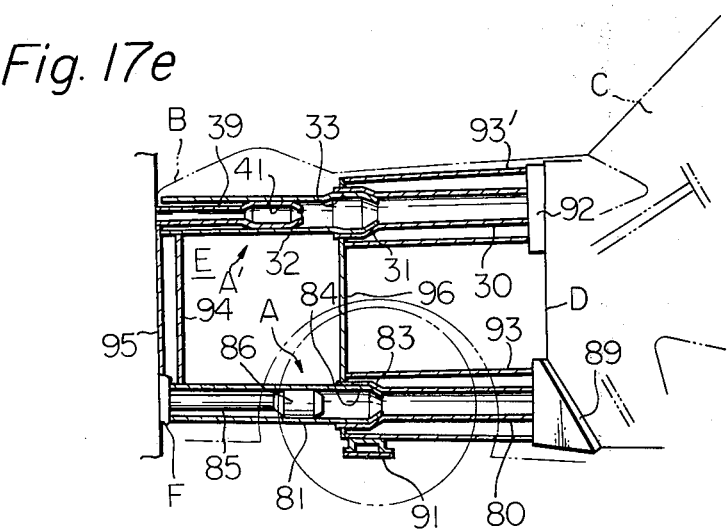
Fig. 17f

IMPACT ABSORBING DEVICE AND MOTOR VEHICLE BODY STRUCTURE INCORPORATING THE SAME

The present invention relates to devices for absorbing mechanical energy produced by impacts resulting from collisions of moving objects such as motor vehicles. The invention further relates to motor vehicle body structures which not only support various parts and units of the motor vehicle, but also absorb mechanical energy produced by impacts resulting from collisions to protect vehicle occupants from injury.

The development of sophisticated technology in the field of motor vehicle production as accelerated a trend toward higher and higher driving speeds of motor vehicles. This trend is reflected by an increased number of traffic accidents and various impact absorbing means have thus far been developed including retractable bumper supports located at the front and/or rear ends of the vehicle bodies. While impact absorbing devices of this type have proved servicable in absorbing small amounts of energy from minor collisions, they are not fully acceptable for the purpose of protecting vehicle occupants from incurred injuries because impact energy is so quickly absorbed. That vehicle occupants are subjected to extremely high rates of deceleration in the event of major collisions. To provide assured protection for vehicle occupants, some motor vehicles are equipped with collapsible steering shafts or columns and/or pads attached to dashboards for protection against frontal collisions and/or with cushioning pillows mounted on the vehicle seat backs in the vehicle cabins for guarding against rear-end collisions. Other known protective means include inflatable bag arrangements using bags which are rapidly inflated between the vehicle occupants and relatively hard structural parts of the motor vehicle upon impact. All these impact absorbing means are ineffectual to providing full assurance of safety for vehicle occupants in the event of violent collisions encountered at high speeds. The present invention contemplates provision of an improved impact absorbing device which eliminates drawbacks commonly inherent in prior art protective means of the above described types.

It is, thus, an important object of the present invention to provide an improved impact absorbing device which is capable of absorbing mechanical energy produced by an impact resulting from a collision of a relatively large magnitude.

Another important object of the invention is to provide an impact absorbing device which is simple in construction and which can be mounted in a limited working space.

While an impact absorbing device according to the present invention will find extensive applications in absorbing mechanical energy produced by impacts between various moving bodies or objects, the device will prove especially useful in mitigating impacts resulting from collisions of motor vehicles. It is, therefore, still another important object of the present invention to provide an improved impact absorbing device for use in a motor vehicle for the protection of vehicle occupants during collisions.

As will be readily appreciated as the description proceeds, an impact absorbing service of the present invention features, primarily, simplicity of construction. An impact absorbing device according to the present invention can thus be utilized either singly or in combination with a reinforcing member or members as a structural member of a vehicle body. It is, accordingly, still another important object of the present invention to provide an improved motor vehicle structure which not only supports various component parts and units of the motor but absorbs mechanical energy produced by an impact caused by a collision of the motor vehicle.

These and other objects of the present invention may be embodied in an impact absorbing device which comprises, in combination, a first elongated member which is hollow substantially throughout its length and which has at least one portion differing in profile from the remainder of the member, and at least one elongated member which has at least one portion differing in profile from the remainder of the member, the second elongated member being telescopically received in the first elongated member with its altered profile portion in surface-to-surface engagement with the altered profile portion of the first elongated member. The second elongated member may be hollow substantially throughout its length. In this instance, at least one of the first and second elongated hollow members is formed of a malleable material so as to be plastically deformable in cross-section along its length when the elongated members are forced to further telescope with each other by a longitudinally received impact force at a magnitude greater than the elastic limit of the malleable material. Alternatively, the altered profile portion of the second elongated member may be formed of a relatively hard material while the first elongated member may be formed of a malleable material so that the latter is caused to deform as the former is forced into the latter by an impact longitudinally exerted on the impact absorbing device.

Where desired, the first and second elongated members may comprise two or more altered profile portions which are longitudinally spaced apart from each other an the member. The spaced altered profile portions of the first elongated member are respectively in surface-to-surface engagement with those of the second elongated member which is telescopically received in the first elongated member. The altered profile portions of each of the members may have cross sections which are either similar to or different from each other. Where the altered profile portions of each elongated member are different from each other, an altered profile portion closer to a telescopically overlapping end of a member has a smaller cross section then an altered profile portion which is farther from a telescopically overlapping end.

Alternatively, one of the first and second elongated members may have two or more longitudinally spaced altered profile portions which are spaced lengthwise on the member while the other of the members has one altered profile portion which is in surface-to-surface engagement with the altered profile portions of the former member. In this case also an altered profile portion closer to a telescopically overlapping end of a member is smaller in cross section than are located farther from the end.

While an impact absorbing device above described has been assumed to comprise two elongated members, the device may further comprise a third elongated member where desired. In this instance, the second elongated member is hollow substantially throughout its length and has at least one additional altered profile portion spaced longitudinally apart from the altered profile portion or portions which are in surface-to-surface engagement with the altered profile portion or portions of the first elongated member in which the former is telescopically received. The third elongated member is formed with at least one altered profile portion and is telescopically received in the second elongated hollow member with its altered profile portion or portions, in surface-to-surface engagement with the additional altered profile portion or portions of the second elongated member. All of the elongated members may be formed of a malleable material so that all of them are plastically deformable when the members are forced to farther telescope with each other. Alternatively, the second and third elongated members may be formed of a malleable material and the first elongated member as a whole made or formed of a hard material, such that the first elongated member is driven into the second elongated member, and the first and the second elongated members are then driven into the third elongated member when the impact absorbing device is subjected to an impact in its longitudinal direction.

The altered profile portion or portions of each elongated member may be of larger or smaller cross section than the remainder of the member Where two or three elongated members are telescopically connected to each other by cross sectionally enlarged altered portions, the elongated member or members telescopically receiving therein a longitudinally neighbouring member or members will be expanded in cross section as the member or members received therein are forced deeper into the former. If conversely, the elongated members are formed with cross-sectionally reduced altered profile portions, the elongated member or members telescopically received in a longitudinally neighbouring member or members will be compressed as the member or members receiving the latter are forced to longitudinally move over the former.

An impact absorbing device of any of the configurations above described consumes mechanical energy from an impact imposed on the device by causing plastic deformation of an elongated member or members if and when the force of impact is greater than the elastic limit of the material or materials forming the elongated member or members. If, therefore, the force of impact exerted on the impact absorbing device is lower than the elastic limit of the elongated member or members, the device remains inoperative, so that where the device is incorporated as a safety apparatus for a motor vehicle, the vehicle occupants will be unprotected in the event the motor vehicle encounters a collision of a relatively small magnitude. If a material having a lower elastic limit is used to avoid this inconvenience, the impact absorbing device will become operative in response to a collision of a relatively low magnitude which would not normally endanger the vehicle occupant. Since, moreover, an impact absorbing device of the above described configuration is irreparable once it has been operated, it is important that the device be maintained intact before it is subjected to an impact of a magnitude that would seriously endanger the vehicle occupants. A useful compromise between these mutually conflicting requirements can be achieved in a combination of irreparable impact absorbing means responsive to an impact likely to be of serious danger to the vehicle occupants, and repairable or restorable impact absorbing means responsive to an impact of a relatively small order. In order to minimize the space requirements for mounting such a combination in a working position and to simplify or even dispense with a mechanical linkage interconnecting the two means, it is desired that both means be compactly integrated into a single unit which is capable of responding to an impact resulting, for example, from a collision of a motor vehicle.

In accordance with the present invention, these requirements are met in an impact absorbing device which comprises, in combination, an elongated hollow member of a malleable material, and generally elongated, longitudinally resilient means longitudinally aligned with in partial surface-to-surface contact with the hollow member, the resilient means being longitudinally compressed when subjected to an impact in a longitudinal direction and capable of returning to its initial length when cleared of the force and being not only longitudinally compressed but longitudinally rammed into the hollow member for plastically deforming the hollow member when subjected to an impact in a longitudinal direction with a force greater than a predetermined value. The resilient means may comprise a hollow cylinder having a closed end portion in surface-to-surface engagement with the malleable hollow member, a piston which is longitudinally movable in the hollow cylinder, spring means for urging the piston away from the closed end portion of the cylinder, and a piston rod connected to the piston and longitudinally projecting outwardly from the closed end portion of the cylinder, wherein the piston rod and piston rammed into the cylinder against the spring force when subjected to an impact. The elongated hollow member and the hollow cylinder may have configurations which are essentially similar to those of the first and second elongated members, respectively, of an impact absorbing device of the configurations previously described. In other words, the hollow member and the hollow cylinder may each have at least one altered profile portion by which the hollow member and cylinder are telescopically connected. It is apparent that the configurations of the hollow member and hollow cylinder above described may be modified to correspond to an impact absorbing device comprising two or three elongated members as previously described. Alternatively, the hollow member may have a recessed closed end wall transversely oriented to the longitudinal direction of the hollow member. The end wall of the hollow member thus has its outer face in surface-to-surface engagement with the closed end portion of the hollow cylinder, so that, when the piston rod of the hollow cylinder is subjected to a force greater than a predetermined value, the end wall of the hollow member is plastically deformed such that the hollow cylinder is driven into the hollow member. Thus, the energy of an impact exerted on the device is consumed primarily in forcing the piston and piston rod into the hollow cylinder, and secondarily in causing plastic deformation of the hollow member.

As previously mentioned, an impact absorbing device herein disclosed is especially useful as a safety apparatus for a motor vehicle. Where an impact absorbing device according to the present invention is utilized as a safety apparatus for a motor vehicle, the device should be connected at either the front or rear of the vehicle end to any rigid cross member of the vehicle body such as, for example, a front or rear bumper or any member or members connected thereto. To provide an additional cushioning effect and to prevent the component parts of the impact absorbing device from buckling when subjected to a longitudinal compressive force, at least one elongated hollow collapsible member may be provided enclosing at least one longitudinal portion of the device. The hollow collapsible member is longitudinally collapsible from its end directed toward the foremost or rearmost end of the vehicle when subjected to an impact in its longitudinal direction with a force greater than the elastic limit of the material forming the collapsible member. In this instance, the collapsible hollow member may extend substantially along the entire length of the combination of the elongated members or of the hollow member and cylinder so that the energy of the impact is partly consumed by longitudinal compression of the hollow collapsible member and partly in longitudinal plastic deformation of the elongated member or members or the hollow member.

An impact absorbing device of any of the configurations above described may be used either singly or through suitable modification, as a structural member of a vehicle body, not only mitigating impact on the vehicle body, but supporting operational parts or units such as, the engine or power transmission system. Where an impact absorbing device is thus utilized as a structural member of the vehicle body, it is preferred that a combination of two, four or even more of such devices be further incorporated with the same number of elongated hollow collapsible members of a nature above described. In this instance, a vehicle body structure comprising a plurality of impact absorbing devices may be so constructed as to have one section which is collapsible when subjected to an impact in a fore-and-aft direction of the body structure, and another section which is substantially rigid against the impact. For this purpose. The collapsible section of the body structure comprises an elongated member or members which are telescopically received in and collapsible into an elongated hollow member fixed to a stationay rigid member of the vehicle body or a collapsible means of a previously mentioned configuration comprising a collapsible section and an elongated hollow member.

Other features and advantages of an impact absorbing device and a vehicle body structure composed of a combination of such devices embodying the present invention will become more apparent from the following description taken in conjunction with the accompanying drawings, in which like reference numerals designate corresponding parts and elements and in which:

FIG. 16b is a cross sectional view taken on line B—B of FIG. 16a;

FIG. 17b is a perspective view of the vehicle body structure illustrated in FIG. 17a;

FIG. 17d is also a cross sectional view taken on line D—D of FIG. 17b;

FIG. 17e is a view similar to FIG. 17a but shows the vehicle body structure in a partially collapsed condition;

FIG. 17f is a view also similar to FIG. 17a illustrating the vehicle body structure in a fully collapsed condition;

Figure 1A:
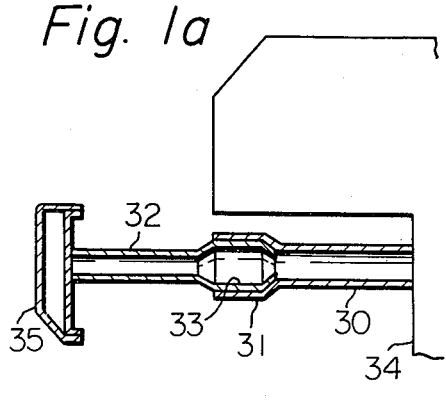
FIG. 1a is a longitudinal sectional view showing a preferred embodiment of an impact absorbing device according to the present invention, the device being illustrated in an unactuated condition.

Reference will now be made to the drawings, first to FIG. 1a which illustrates a first preferred embodiment of an impact absorbing device according to the present invention. The impact absorbing device comprises a first elongated tubular member 30 having an enlarged end portion 31 and a second elongated tubular member 32 having an enlarged end portion 33. The enlarged end portion 31 of the first elongated tubular member 30 receives therein the enlarged end portion 33 of the second elongated tubular member 32 so that the latter is telescopically connected with the former through surface-to-surface engagement between the enlarged end portions 31 and 33. The first elongated tubular member 30 is rigidly connected at its end opposite the enlarged end portion 31 to a suitable stationary rigid member or structure 34, while the second elongated tubular member 32 carries an impact receiving member or structure 35 at its end opposite the enlarged end portion 33 thereof. Where the impact absorbing device is utilized as a safety apparatus for a motor vehicle as previously mentioned, the rigid stationary member or structure 34 may be any cross member of the vehicle body, and the impact receiving member or structure 35 may be a front or rear bumper.

The first and second elongated tubular members 30 and 32, respectively, are made of a suitable malleable or ductile material such as aluminum, copper, iron or ductile plastic.

Figure 1B:
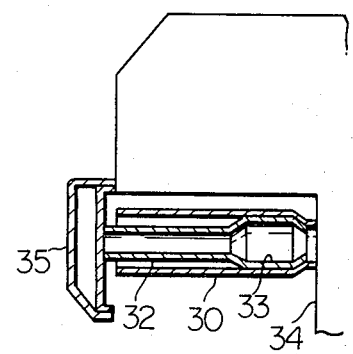
FIG. 1b is a view similar to FIG. 1a but shows the impact absorbing device in a fully collapsed condition in response to an impact exerted thereon.

When, thus, an impact absorbing device of the above described configuration is subjected at its impact receiving member 35 to an impact resulting, for example, from a collision encountered by the motor vehicle, the second elongated tubular member 32 will be longitudinally rammed into the first elongated tubular member 30 so that the longitudinal portion of the first elongated tubular member 30 diverging into the enlarged end portion 31 is forced to expand in cross section by the enlarged end portion 33 of the second elongated tubular member 32 if a force exerted on the receiving member 35 is greater than the elastic limit of the material of the first elongated tubular member 30. The second tubular member 32 will stop at an intermediate point in the first tubular member 30 if the force of impact exerted on the impact receiving member 35 is absorbing out before the second tubular member 32 reaches the end of the first tubular member 30 adjacent to the stationary member 34. Alternatively, the second tubular member 32 will be rammed to the end of the first tubular member 30 adjacent the stationary member 34 so that the first tubular member 30 is expanded in cross section throughout its length as shown in FIG. 1b. The mechanical energy of the impact exerted on the impact receiving member 35 is in this manner absorbed by in causing plastic deformation of the first tubular member 30. The energy absorbing ability of an impact absorbing device of the configuration above described may be specified in terms the geometry, wall thicknesses, coefficients of friction and other mechanical properties of the members making up the device.

Figure 2:
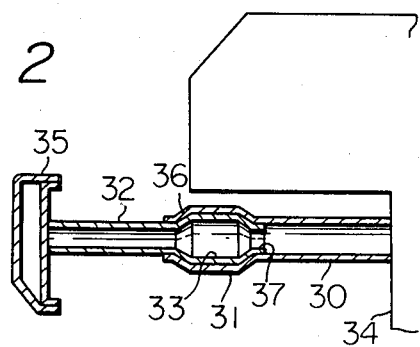
FIG. 2 is a longitudinal sectional view showing a modification of an impact absorbing device illustrated in FIGS. 1a and 1b.

To facilitate the longitudinal movement of the second tubular member 32 through the first tubular member 30, the enlarged end portions 31 and 33 respectively thereof may be tapered in the direction of travel of the second tubular member 32, as shown in FIGS. 1a and 1b. Where desired, moreover, the enlarged end portions 31 of the first tubular member 30 may have a longitudinal extension 36 which is formed over the enlarged end portion 33 of the second tubular member 32, and/or the enlarged end portion 33 of the second tubular member 32 may have a longitudinal extension 37 which extends into the first tubular member 30 as shown in FIG. 2. Through provision of the extension 36 and/or the extension 37, the tubular members 30 and 32 respectively are prevented from being disconnected from each other if they are pulled in a direction away from each other as in a case in which the motor vehicle is being towed by a bumper. The longitudinal extensions 36 and 37 will further serve to facilitate surface-to-surface engagement between the enlarged end portions 31 and 33 respectively and accordingly supplement the resistance of the device to bending stresses so that the tubular members 30 and 32 can endure an increased force applied thereto in a transverse direction.

Figure 3A:
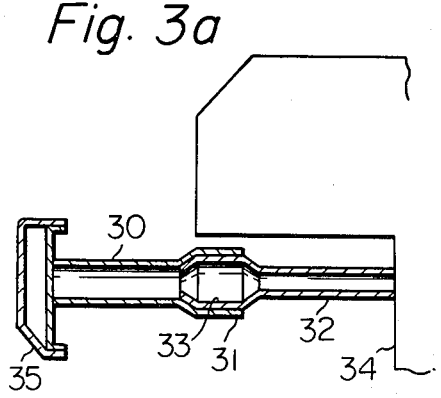
FIG. 3a is a longitudinal sectional view showing another preferred embodiment of an impact absorbing device according to the present invention in an unactuated condition.
Figure 3B:
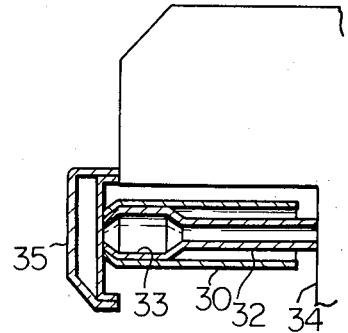
FIG. 3b is a view similar to FIG. 3a but shows an impact absorbing device in a fully collapsed condition.

Although the embodiment above described has been assumed to have the first elongated tubular member 30 connected to the rigid stationary member or structure 34 and the second elongated tubular member 32 connected to the impact receiving member or structure 35, so that the second tubular member advances into the first tubular member which is held in situ, such is by way of example only and thus the members 30 and 32 may be connected conversely to the members or structures 34 and 35 where desired, an example of such an arrangement being illustrated in FIGS. 3a and 3b. Referring to FIG. 3a, the first elongated tubular member 30 carries the impact receiving member or structure 35 at its end opposite the elongated end portion 31, while the second elongated tubular member 32 telescopically connected to the member 30 with its enlarged end portion 33 received in the end portion 31, and is connected to the rigid stationary member or structure 33. When the impact receiving member or structure 35 which may be a bumper of a motor vehicle is subjected to an impact, the first elongated tubular member 30 is forced toward the rigid stationary member or structure 34 and, if the force of impact is greater than the elastic limit of the material forming the first tubular member 30, then the first tubular member 30 will be longitudinally moved over the enlarged end portion 33 of the second tubular member 32 which is fixed to the stationary member or structure 34. The first tubular member 30 is consequently expanded in cross section along its length as shown in FIG. 3b. It is apparent that the movement of the first tubular member 30 will terminate at an intermediate position on the second tubular member 32 if the energy of impact has been absorbed by plastic deformation of the first tubular member 30 before the tubular member 30 reaches the end of the second tubular member 32 opposite the enlarged end portion 33.

Figure 4:
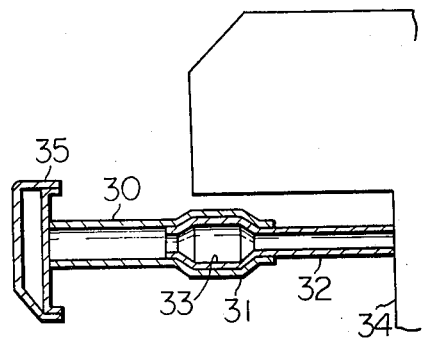
FIG. 4 is a longitudinal sectional view showing a modification of an impact absorbing device shown in FIGS. 3a and 3b.

Similar to the embodiment shown in FIG. 2, an impact absorbing device of the configuration illustrated in FIGS. 3a and 3b may be modified in a manner so that the enlarged end portion 31 of the first tubular member 30 has a longitudinal extension 36 and the second tubular member 32 merging from the enlarged end portion 33 has a longitudinal extension 37 as shown in FIG. 4. The first and second tubular members 30 and 32, respectively, are thus prevented from being disconnected from each other if a force is applied in a direction such as to pull them apart during, for example, towing a vehicle by a bumper.

Figure 5:
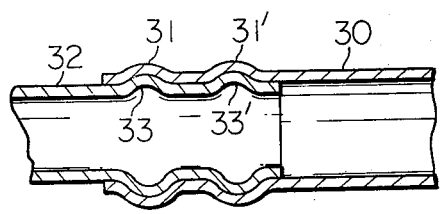
FIG. 5 is a partial longitudinal sectional view showing still another preferred embodiment of an impact absorbing device according to the present invention.
Figure 6:
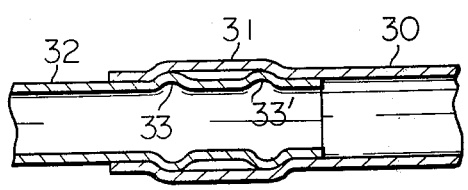
FIG. 6 is a partial longitudinal sectional view showing a modification of an impact absorbing device shown in FIG. 5.
Figure 7:
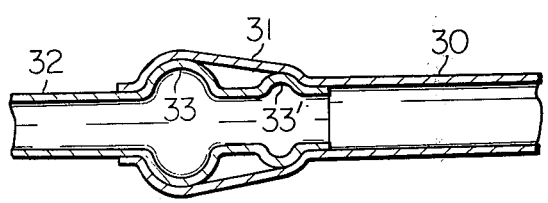
FIG. 7 is a partial longitudinal sectional view showing another modification of an impact absorbing device illustrated in FIG. 5.
Figure 8:
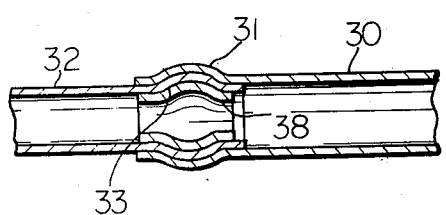
FIG. 8 is a partial logitudinal sectional view showing still another preferred embodiment of an impact absorbing device according to the present invention.

Although the embodiments thus far described comprise the elongated tubular members telescopically connected together by one enlarged end portion formed on each of the members, the members may be connected to each other through two or even more enlarged portions formed on each of the members. FIG. 5 illustrates an embodiment in which the elongated tubular members are telescopically connected together by two enlarged portions formed on each of the members. Referring to FIG. 5, a first elongated tubular member 30 has longitudinally spaced enlarged portions 31 and 31' while the second elongated tubular member 32 has longitudinally spaced enlarged portions 33 and 33' which are tightly received by surface-to-surface engagement in the enlarged portions 31 and 31', respectively, of the first elongated tubular member 30. While in the embodiment of FIG. 5 each of the first and second elongated tubular members 30 and 32, respectively, is formed with two enlarged portions 31 and 31' and 33 and 33', respectively the second elongated tubular member 32 only may be provided with two longitudinally spaced enlarged portions 33 and 33' so that one enlarged portion 31 formed on the first elongated tubular member 30 receives both of the enlarged portions 33 and 33' therein as illustrated in FIG. 6. The enlarged portions 33 and 33' of the second elongated tubular member 32 are herein shown as having substantially identical cross sections. Where desired, however, the enlarged portion 33, which is farther than the enlarged portion 33' from the end of the second elongated tubular member 32 may be larger in cross section than the enlarged portion 33' so that the enlarged portion 31 of the first elongated tubular member 30 is tapered in the direction of travel of the second tubular member 32 as shown in FIG. 7. In this instance, the first elongated tubular member 30 is expanded in cross section by the smaller enlarged portion 33' of the second elongated tubular member 32 and the larger enlarged portion 33 of the tubular member 32 as the first tubular member 30 is rammed into the second tubular member 32 by an impact longitudinally exerted on the tubular member or members. This configuration will thus serve to facilitate the plastic deformation of the first tubular member 30 by the enlarged portions 33 and 33' of the second tubular member 32.

Where the first and second elongated tubular members of any of the configurations thus far described are formed of a material or materials having substantially the same mechanical properties, especially, malleability, then not only the first elongated tubular member 30 but the enlarged portion or portions or the second elongated tubular member 32 will be plastically deformed so that the first tubular member 30 fails to be expanded to a desired cross section which is that of the enlarged portion of portions of the second tubular member 32 which moves into the first tubular member 30. FIG. 8 illustrates an embodiment which prevents this from occurring. The embodiment shown in FIG. 7 is assumed to be a modification of the embodiment illustrated in FIG. 1a or 3a and thus includes the first and second elongated tubular members 30 and 32 which are telescopically connected with each other by surface-to-surface engagement between enlarged end portions 31 and 33 formed on the tubular members 30 and 32, respectively. A substantially tubular reinforcement member 38 is tightly attached within the enlarged end portion 33 of the second elongated tubular member 32. The reinforcement member 38 is formed of a material which is less malleable than the material forming the second tubular member 32 so that the enlarged end portion 33 of the second tubular member 32 is prevented from being compressed as it is forced through the first tubular member 30.

Figure 9A:
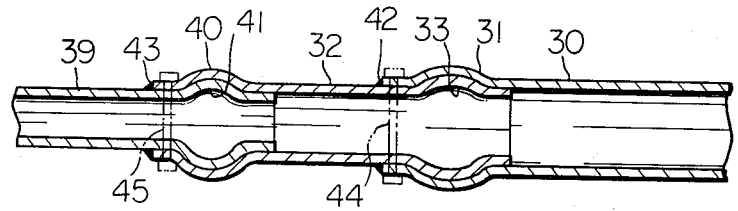
FIG. 9a is a partial longitudinal sectional view showing still another preferred embodiment of an impact absorbing device according to the present invention, the device being illustrated in an unactuated condition.
Figure 9B:
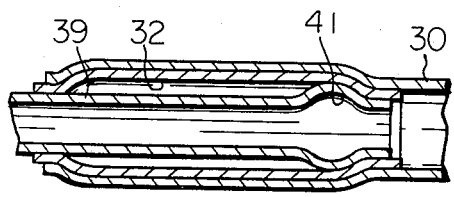
FIG. 9b is a view similar to FIG. 9a but shows the impact dampening device in a fully collapsed condition.

The embodiments of the impact absorbing device according to the present invention have thus far been described as being made up of two telescopically connected tubular members. This, however, is merely by way of example and, where desired, an impact absorbing device embodying the present invention may comprise three or even more elongated tubular members which are telescopically longitudinally connected with each other. FIGS. 9a and 9b illustrate an embodiment of an impact absorbing device comprising three elongated tubular members.

Referring to FIG. 9a, an impact absorbing device comprises first, second and third elongated tubular members 30, 32 and 39, respectively. Similar to any of the embodiments thus far described, the first and second elongated tubular members 30 and 32 have enlarged end portions 31 and 33, respectively, by which the first elongated tubular member 30 telescopically receives therein the second elongated tubular member 32. The second elongated tubular member 32 is further provided with an enlarged end portion 40 opposite its end engaging the first tubular member 30, while the third elongated tubular member 39 has an enlarged end portion 41. The enlarged end portion 41 of the third tubular member 39 is tightly received in the enlarged end portion 40 of the second tubular member 32 so that the tubular members 32 and 39 are telescopically connected with each other. The tubular members 30 and 32 are formed of a malleable material or materials and the tubular members 30, 32 and 39 have cross sections which sequentially are smaller. Where desired, suitable retaining means may be provided which are adapted to reinforce the engagement between the first and second tubular members 30 and 32 and between the second and third tubular members 32 and 39. For this purpose, the first tubular member 30 may be welded at its end 42 to the portion of the second tubular member 32 adjacent the enlarged end portion 33 and, likewise, the second tubular member 32 may be welded at its end 43 to the portion of the third tubular member 39 adjacent the enlarged end portion 41. Alternatively, the retaining means may comprise a rupturable pin 44 passing through the first and second tubular members 30 and 32 respectively adjacent to the enlarged end portions 31 and 33, and a rupturable pin 45 passing through the second and third tubular members 32 and 39 adjacent to the enlarged end portions 40 and 41, as indicated by phantom lines in FIG. 9a. Retaining means of the types above described will serve to provide the tubular members 30, 32 and 39 with increased resistance to bending stresses they may be subjected to during use and to prevent them from being dislocated or disconnected from each other when a force is applied in a direction such as to pull them out of each other.

Where an impact absorbing device of the configuration above described is used as a safety apparatus for a motor vehicle, one of the first or third tubular member 30 and 39, respectively, is connected at its far end to a suitable rigid member or structure of the vehicle body, and the other is connected at its far end to a front or rear bumper or any cross member or structure located at the front or rear end of the vehicle body.

When the impact absorbing device is subjected to an impact resulting for example from a collision of a motor vehicle, the elongated tubular members 30, 32 and 39 are longitudinally forced toward each other so that the welds at the ends 42 and 43 or the pins 44 and 45 are ruptures to allow the tubular members 30, 32 and 39 to further longitudinally telescope with each other. If, under these conditions, the force of impact is greater than the elastic limits of the materials forming the first and second elongated tubular members 30 and 32, respectively, then the third and second tubular members 39 and 32 will be longutudinally rammed into the first tubular member 30, with the result that the first and second tubular members 30 and 32 respectively are plastically deformed or expanded along their lengths by means of the enlarged portions 33 and 41 of the second and third tubular members 32 and 39, respectively, as shown in FIG. 9b. The energy of impact on the import absorbing device is in this manner consumed by causing plastic deformation of the first and second elongated tubular member 30 and 32 respectively. To prevent the enlarged end portion 41 of the third tubular member 39 from being reduced in cross section or compressed when moved into the second tubular member 32, a reinforcement member 38 incorporated in the embodiment shown in FIG. 8 may be attached inside the enlarged portion 41.

Figure 10:
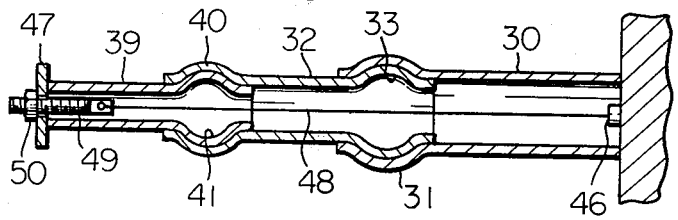
FIG. 10 is a longitudinal sectional view showing a modification of an impact absorbing a configuration illustrated in FIGS. 9a and 9b.

FIG. 10 illustrates a modification of an impact absorbing device of the above described configuration. The modified embodiment herein shown has means to constantly longitudinally urge the first, second and third elongated tubular members 30, 32 and 39 toward each other so that the members are prevented from being dislocated or misaligned from their initial positions when the impact absorbing device is unactivated. This means comprises rigid cross members 46 and 47 which are connected to the far ends of the first and third elongated tubular members 30 and 39, respectively, and a suitable flexible elongated member such as a wire rope 48 which extends throughout the longitudinal bores of the tubular members 30, 32 and 39 and which is connected at its ends to cross members 46 and 47. The wire rope 48 is maintained between the cross members 46 and 47 so that individual tubular members 30, 32 and 39 are held in close engagement with each other. To maintain the wire rope 48 at a sufficient tension, the wire rope 48 may be connected to the cross member 47 through a suitable adjusting means such as, for example, an adjustment bolt 49 which is anchored to the cross member 47 by a nut 50. Where the impact absorbing device of the configuration above described is incorporated in a motor vehicle, the cross members 46 and 47 may be fastened to a rigid stationary member or structure of the vehicle body and a front or rear bumper (not shown), respectively.

Figure 11:
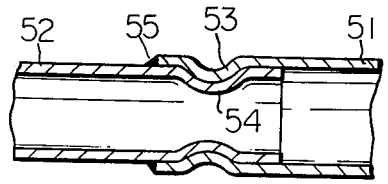
FIG. 11 is a partial longitudinal sectional view showing still another preferred embodiment of an impact dampening device according to the present invention.
Figure 12:
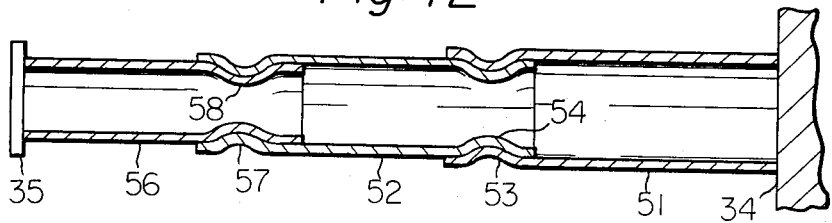
FIG. 12 is a longitudinal sectional view showing a modification of an impact absorbing device illustrated in FIG. 11.

While the embodiments of an impact dampening device according to the present invention have been assumed to be made up of elongated tubular members having enlarged portions, the members constituting the impact absorbing device may be connected with each other through otherwise configured means. FIGS. 11 and 12 illustrate examples of the elongated tubular members which are connected together by constrictions.

Referring to FIG. 11, an impact absorbing device comprises first and second elongated tubular members 51 and 52 having constrictions or reduced portions 53 and 54, respectively. The first elongated tubular member 51 is larger in cross section than the second elongated tubular member 52 and receives in its reduced portion 53 the reduced portion 54 of the second tubular member 52 so that the tubular members 51 and 52 are telescopically connected together. The second elongated tubular member 52 is formed of a malleable material such as aluminium, copper, iron, or a ductile plastic. When, thus, the first and second eelongated tubular members 51 and 52, respectively, are further longitudinally forced together by with a force of impact which is greater than the elastic limit of the material forming the second elongated tubular member 52, the second tubular member 52 is plastically deformed or compressed along its length so as to be reduced in cross section as the reduced portion 53 of the first elongated tubular member 51 is longitudinally forced over the second tubular member 52. The energy of impact on the impact absorbing device is by this manner consumed in causing plastic deformation or reduction in cross section of the second elongated tubular member 52. To prevent the first and second tubular members 51 and 52, respectively, from being disconnected when they are longitudinally pulled away from each other, the first 55 to the 55 to the outer peripheral surface of the stem portion second tubular member 52 adjacent to the reduced portion 54. Alternatively, the tubular members 51 and 52 may be interconnected by means of a suitable ruptuable member or members such as a pin used in the embodiment illustrated in FIGS. 9i a and 9b, though not shown in FIG. 11.

FIG. 12 illustrates an embodiment of an impact absorbing device having three elongated tubular members which are connected telescopically with to each other through constrictions formed thereon. Thus, the impact absorbing device shown in FIG. 12 comprises first, second and third elongated tubular members 51, 52 and 56 which sequentially are smaller in cross section. Similar to the embodiment shown in FIG. 11, the first and second elongated tubular members 51 and 52, respectively, are telescopically connected together through surface-to-surface engagement between the reduced portions 53 and 54 which are respectively formed on the members 51 and 52. The second elongated tubular member 52 is formed with a second reduced portion 57 adjacent its end opposite the first reduced portion 53, while the third elongated tubular member 56 is formed with a reduced portion 58. The reduced portion 58 is tightly received in the second reduced portion 57 of the second elongated tubular member 52 so that the tubular members 52 and 56 are telescopically connected together. An impact absorbing device of the construction shown in FIG. 12 has its second and third elongated tubular members 52 and 56 plastically deformed along their lengths or compressed as the reduced portions 53 and 57 of the first and second elongated tubular members 51 and 52, respectively, are moved thereover by a force of impact greater than elastic limit of the material or materials forming the second and third tubular members 52 and 56. Where the impact absorbing device above described is used as a safety apparatus for a motor vehicle, the first and third elongated tubular members 51 and 56, respectively, may be rigidly connected at their for ends to a suitable stationary rigid member or structure 34 of a vehicle body and a bumper 35 or any cross member located at the front or rear end of the vehicle body.

Figure 13:
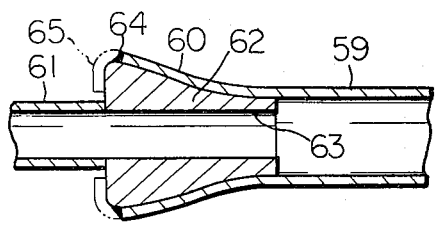
FIG. 13 is a partial longitudinal sectional view showing still another preferred embodiment of an impact absorbing device according to the present invention.
Figure 14:
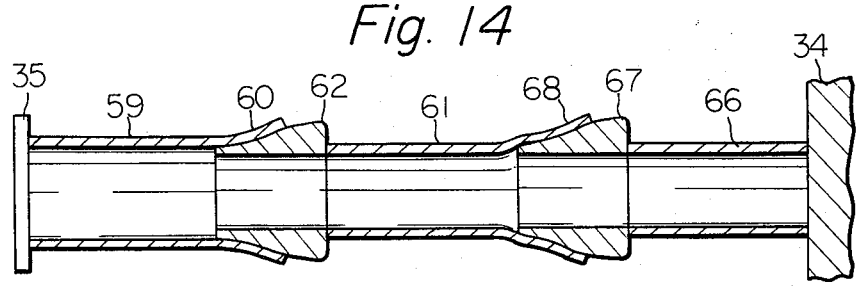
FIG. 14 is a longitudinal sectional view showing a modification of an impact absorbing device illustrated in FIG. 14.

FIGS. 13 and 14 illustrate still other preferred embodiments of an impact absorbing device according to the present invention comprising at least one elongated tubular member and at least one elongated member having a rigid tapered portion which is received in elongated the tubular member for expanding the elongated tubular member when forced thereinto.

Referring to FIG. 13, an impact absorbing device comprises an elongated tubular member 59 which has a generally flared end portion 60 and an elongated member 61 which has a tapered ram portion 62 formed of a rigid material. The elongated member 61 is herein assumed to be tubular in its entirely having an axial bore 63 but, where desired, the member 61 may have a solid construction. The tapered ram portion 62 of the elongated member 61 is tightly received in the flared end portion 60 of the tubular member 59 so that the latter will be plastically deformed or expanded in cross section along its length when the rigid tapered ram portion 62 is longitudinally rammed into the tubular member 59 by a force of impact applied to the the members 61 and 59 in their longitudinal directions. To prevent the tubular member 59 and tapered ram portion 62 from being disengaged or dislocated from each other when the members 59 and 61 are longitudinally pulled away from each other, the flared and portion 60 of the tubular member 59 may be welded at its end 64 to the enlarged end of the cam portion 62, or may have an extension 65 which is flared over the enlarged end wall of the ram portion 62 as indicated in phantom. While serving to hold the members 59 and 61 in their initial positions when the device is deactivated, the weld at the end 64 will be ruptured when the members 59 and 61 are longitudinally forced toward each other by an impact force applied thereto. Where an impact absorbing device of the configuration described is used as a safety apparatus for a motor vehicle, the members 59 and 61 are rigidly connected at their for ends to a suitable rigid member or structure of the vehicle body and to a bumper or any cross member or structure respectively, located at a front or rear end of the vehicle body.

FIG. 14 illustrates a modification of an embodiment of the impact absorbing device above described. An impact absorbing device herein shown comprises, in addition to an elongated tubular member 59 and an elongated member 61 having the tapered ram portion 62, an elongated member 66 having a tapered ram portion 67 formed of a rigid material similar to that of the ram portion 62. While the elongated member 61 is connected to the elongated tubular member 59 by engagement between the tapered ram portion 62 and a generally flared end portion 60 of the members 61 and 59, respectively, as is the case with the embodiment of FIG. 13, the elongated member 61 now has a generally tubular profile with a generally flared end portion 68 opposite the tapered ram portion 62. The flared end portion 68 closely receives therein surface the tapered ram portion 67 of the elongated member 66 so that the members 59, 61 and 66 are sequentially telescopically connected with each other through the engagement between the flared end portions 60 and 68 and the tapered ram portions 62 and 67, respectively. To prevent the individual members 59, 61 and 66 from being disconnected when longitudinally pulled away from each other, the flared portions 60 and 68 may be welded at their ends to the outer peripheral surfaces of the ram portions 62 and 67 respectively or may have extensions which are formed around the enlarged end walls of the ram portions 62 and 67 in a manner described with reference to FIG. 13. The energy of impact exerted on the impact absorbing device above described is consumed partly in plastic deformation of the elongated tubular member 59 caused by the first ram portion 62 being rammed therein and partly in plastic deformation of the elongated tubular member 61 caused by the longitudinal movement of the second ram portion 67 being rammed therein. Where the impact absorbing device above described is to be incorporated in a motor vehicle, the elongated members 66 and 59 are rigidly connected to a suitable stationary rigid member or structure 34 of the vehicle body and to a front or rear bumper 35 or any cross member located at the front or rear end of the vehicle body, respectively.

Figure 15A:
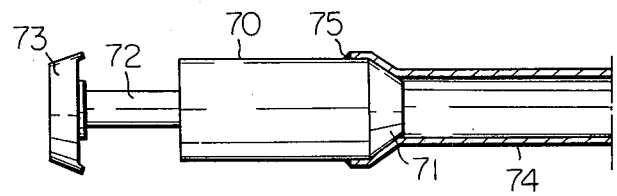
FIG. 15a is a side view showing partially in section still another preferred embodiment of an impact absorbing device according to the present invention in an unactuated condition.

While the embodiments of the impact absorbing device thus far described are all actuated by an impact with a force greater than an elastic limit or limits of the member or members making up the device, the embodiments illustrated in FIGS. 15a to 15a are capable or responding not only to such an impact but also to an impact with a force lower than the elastic limit of a deformable member. The embodiments shown in FIGS. 16a to 16c are further characterized in that they are restorable to their initial conditions after they have responded to impacts of relatively small magnitudes. An impact absorbing advice of the configuration shown in FIGS. 15a to 15c thus uses an elongated resilient means which is adapted to be longitudinally contracted when subjected to a compressive force smaller than a predetermined value and allowed to extend to its initial length when cleared of such an impact. While the contractable means of this nature will be embodied in numerous manners which are known per se, the means will be herein assumed to be of the type in which operates on a pneumatic, hydraulic or hydropneumatic principle using a piston which is constantly biased to project from a cylinder by a pressure developed by a compressive or incompressive fluid or a combination of compressive and incompressive fluids. Such a contractable means is well known in the art as the pneumatic, hydraulic of hydropneumatic spring and as such no detailed internal configuration thereof is herein illustrated.

Referring to FIG. 15a, the contractable means comprises a cylinder 70 having a tapered end portion 71. The cylinder 70 is internally formed with compartments which are separated from each other by a piston axially movable within the cylinder and constantly biased away from the tapered end portion 71 by a pressure of a fluid or fluids filling the compartments, though not seen in the drawings. A plunger or piston rod 72 extends longitudinally from the piston and projects outwardly of the cylinder through an end wall (no numeral) of the cylinder 70 opposite the tapered end portion 71, as illustrated. The plunger or piston rod 72 carries at its far end an impact receiving member 73 which may be a front or rear bumper of a motor vehicle where the impact absorbing device is used as a safety apparatus for a motor vehicle. The piston rod 72 and accordingly the impact receiving member 73 are thus constantly urged away from the tapered end portion 71 of the cylinder 70 or, in other words, the resilient means is normally extended to its full length. An elongated tubular member 74 has a generally flared end portion 75 which tightly receives therein the tapered end portion 71 of the cylinder 70 so that the cylinder 70 and tubular member 74 are telescopically connected with each other. The tubular member 74 is formed of a malleable material so that it is plastically deformable or expansible in cross section along its length when the cylinder 70 is rammed into the tubular member 74. The tubular member 74 may be attached to the cylinder 70 is a suitable manner such as, for example, a weld 79 between the flared end portion 75 and the tapered end portion 71 of the cylinder 70

Figure 15B:
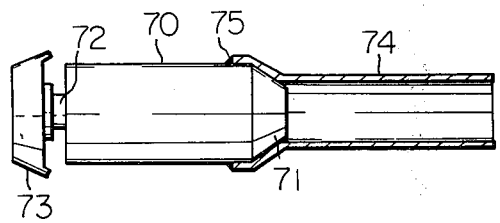
FIG. 15b is a view similar to FIG. 15a but shows the impact dampening device in a partially collapsed condition.
Figure 15C:
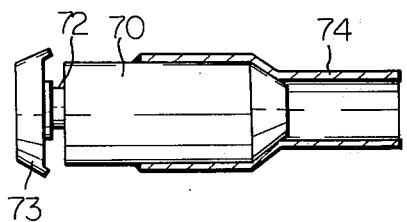
FIG. 15c is a view also similar to FIG. 15a but shows the impact absorbing device in a fully collapsed condition.
Figure 16A:
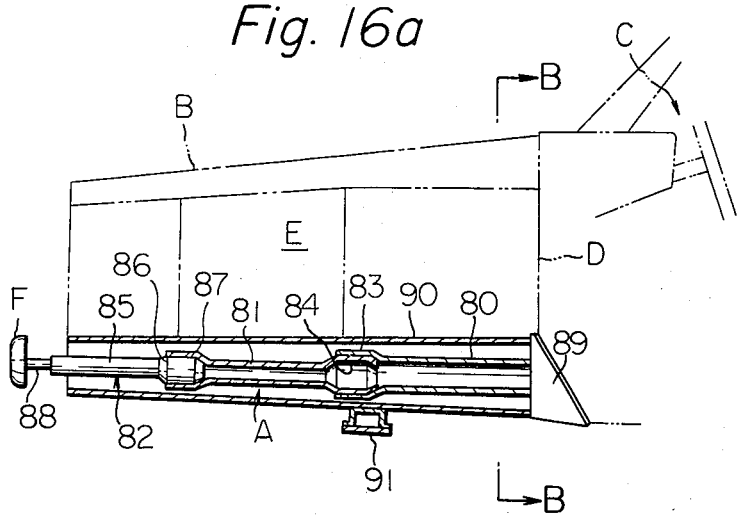
FIG. 16a is a longitudinal sectional view showing a motor vehicle body structure incorporating the impact absorbing devices embodying the present invention in an unactuated condition.
Figure 16B:
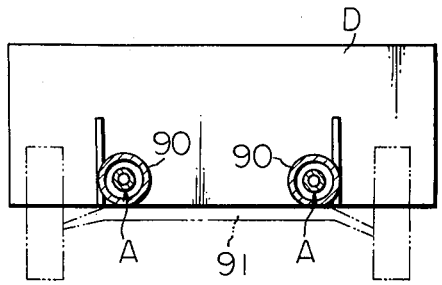
Figure 16C:
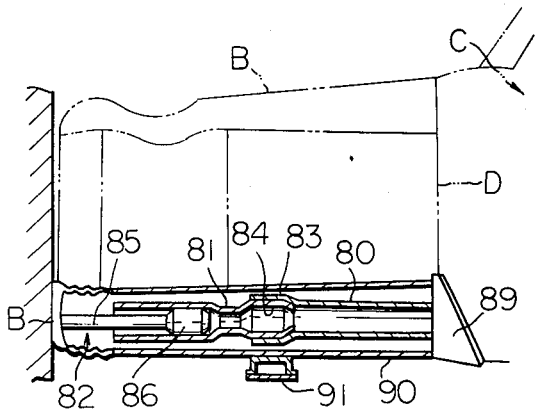
FIG. 16c is a view similar to FIG. 16a but shows the vehicle body structure which is in a partially collapsed condition.

When, now, an impact absorbing device of a configuration above described is subjected to a longitudinal impact at the impact receiving member 73 so that the piston rod 72 and accordingly the piston (not shown) in the cylinder 70 are subjected to a longitudinal force lower than a predetermined value, the piston, piston rod 72 and impact receiving member 73 will be longitudinally moved toward the tapered end portion 71 of the cylinder 70 against the fluid pressure acting on the piston, as shown in FIG. 15b. The energy of the impact on the impact absorbing device is in this manner consumed in causing the piston to be moved into the cylinder 70. Under these conditions, the tubular member 74 is maintained in its initial condition because the force of impact on the device is assumed to be lower than the elastic limit of the material forming the tubular member 74. If, however, the force of impact exerted on the impact receiving member 73 is greater than the above mentioned predetermined value which can not fully absorbed by displacement of the piston in the cylinder 70, the weld 79 between the cylinder 70 and the flared end portion 75 of the tubular member 74 will be ruptured and the cylinder 70 will be rammed into the tubular member 74, which is consequently plastically deformed or expanded in cross section along its length as shown in FIG. 15c. Any energy of impact remaining unconsumed from the displacement of the piston in the cylinder 70 is in this manner consumed by plastic deformation of the tubular member 74.

Where an impact absorbing device of the above described configuration is incorporated in a motor vehicle, the impact receiving member 73 may be a front or rear bumper as previously mentioned, while the tubular member 74 is connected at its far end to any rigid member or structure of the vehicle body. In this instance, the tubular member 74 may be directly connected to a rigid member of the vehicle body or, where desired, through one or more additional elongated members which are telescopically connected with the tubular member 74 as in any of the embodiments of an impact absorbing devices previously described.

As has thus far been mentioned repeatedly, an impact absorbing device herein disclosed finds a typical application as a safety apparatus for a motor vehicle. FIGS. 16a to 16d illustrate a preferred example of a vehicle body structure using an impact absorbing devices in accordance with the present invention. The impact absorbing devices incorporated in the vehicle body structure herein shown may have any of the constructions thus far described with reference to the drawings, and are all assumed to have configurations which are modified from the configuration illustrated in FIG. 15a.

Thus, a vehicle body structure shown in FIGS. 16a to 16d includes two impact absorbing devices which are designated in their entireties by reference character A. Each of the impact absorbing devices A comprises first and second elongated tubular members 80 and 81, respectively, and an elongated, longitudinally resilient unit 82. The first and second tubular members 80 and 81 are formed with enlarged end portions 83 and 84, respectively, and are telescopically connected together with the enlarged portion 84 of the latter tightly received in the enlarged end portion 83 of the former. The combination of the second tubular member 81 and the longitudinally resilient unit 82 is essentially similar in configuration to the embodiment shown in FIG. 15a, the resilient unit 82 thus having a cylinder 85 having an enlarged end portion 86 which is tightly received in an enlarged end portion 87 of the second tubular member 81. The cylinder 85 has a piston (not shown) which is movable by or against a fluid pressure in the cylinder 85 and a piston rod or plunger 88 projecting outwardly from the cylinder 85.

The two impact absorbing devices A are transversely spaced apart by a suitable distance as shown in FIG. 16b and extend parallel to the fore-and-aft direction of the vehicle body which is designated in its entirety by a reference character B in FIG. 16a. While the impact absorbing devices A may be positioned either in front of or at the rear of a vehicle passenger generally designated by compartment reference character C, the same are illustrated as being disposed between the front end of the vehicle body B and the vehicle passenger compartment C, having their first elongated tubular members 80 rigidly connected at their rearmost ends directly or by a rigid mounting plate or plates 89 with a dashboard D forming part of the vehicle body B. The piston rods 88 projecting from the cylinders 85 carry a front bumper F.

Figure 16D:
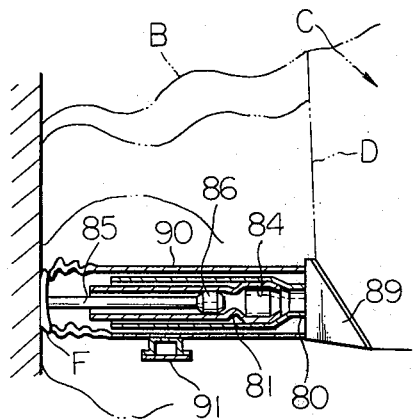
FIG. 16d is a view also similar to FIG. 16a but now shows the vehicle body structure in a fully collapsed condition.

To provide the vehicle body structure with an additional cushioning effect, each of the impact absorbing devices A of the above described configurations may be enclosed within elongated hollow members 90 which have one end rigidly connected directly or through the mounting plate or plates 89 to the dashboard D and the other end terminating adjacent to the front end of the resilient unit 82. The hollow member 90 may extend about the entire length of the impact absorbing device - or have its foremost end offset from the front end of the resilient unit 82 as illustrated. The hollow members 90 thus enclosing the two impact absorbing devices A are formed of a malleable material so that they are longitudinally collapsed when the motor vehicle encounters a frontal collision at its bumper F, and accordingly the piston rods 88 of the resilient units 82 are forced to retract into the cylinders 85. Energy of an impact of small magnitude on the motor vehicle is in this manner consumed partly be deformation of the resilient units 82 and partly in collapsion of the hollow members 90 at incipient stages of the collision condition. If the force of impact is greater than the elastic limits of the first and second tubular members 80 and 81, then these members will be plastically deformed and expanded in cross section along their length as the enlarged portions 84 and 86 of the second tubular member 81 and the cylinder 85, respectively, are moved toward the dashboard D. In this instance, the enlarged portion 86 of the cylinder 85 will be first rammed into the second elongated tubular member 81 so that the tubular member 81 is forced to expand as shown in FIG. 16c and, if the energy of impact is still not completely consumed the enlarged portion 84 will be rammed into the first tubular member 80 which is consequently expanded in cross section as illustrated in FIG. 16d. As the second and first tubular members 81 and 80, respectively, are deformed along their lengths, and the cylinder 85 the and second tubular member 81 are moved into the second and first tubular members 81 and 80, respectively, toward the rear ends of the members 81 and 80, the hollow collapsible members 90 are concurrently collapsed toward their ends attached to the dashboard D so that the energy of impact unconsumed by deformation of the resilient units 82 is absorbed out not only by plastic deformation of the tubular members 80 and 81, but also by collapse of the hollow collapsible members 90.

Where desired, the elongated hollow collapsible members 90 may be utilized not only for absorbing energy of an impact on the motor vehicle but for the purpose of supporting various operating parts and units such as an engine or power transmission mechanism accommodated within the engine compartment E with or without modification made thereto. Designated by a reference numeral 91 are suspension support members which are rigidly connected to the underside of the hollow collapsible members 90 for attachment to a suspension structure positioned underneath the engine compartment E.

FIGS. 17a to 17f illustrate another preferred example of a vehicle body structure using impact absorbing devices herein proposed. Referring concurrently to FIGS. 17a to 17d, the vehicle body structure now comprises a pair of impact dampening devices A which are similar in construction to those incorporated in the vehicle body structure showin in FIG. 16a and a pair of impact absorbing devices A' which are similar in construction to the embodiment shown in FIG. 9a. The corresponding parts of the impact absorbing devices A and A' and those of the devices shown in FIG. 16a and 9a, respectively, are generally designated by like reference numerals, and the description of the devices of FIGS. 16a and 9a is therefore applicable to the devices shown in FIGS. 17a to 17f.

While the impact absorbing devices A extend in a fore-and-aft direction of a vehicle body B adjacent to the understructure thereof, the impact absorbing devices A' extend along upper structural members (not shown) of the vehicle body B. The impact absorbing devices A have first elongated tubular members 80 rigidly connected at their rear ends directly or through a mounting plate or plates 89 to a lower part of a dashboard D and have piston rods 88 of the resilient units 82 connected at their front ends to a front bumper F. The impact absorbing devices A', on the other hand, have first elongated tubular members 30 rigidly connected at their rear ends directly or through a mounting plate or plates 92 to an upper part of the dashboard D, and third elongated tubular members 39 terminating at the foremost end of a vehicle body B as clearly seen in FIGS. 17a and 17b.

The first elongated tubular members 80 and 30 of the impact absorbing devices A and A' are enclosed within elongated hollow members 93 and 93', respectively, which are rigidly connected at their rear ends to the dashboard D directly or through the mounting plates 89 and 92. The hollow members 80 and 30 terminate in enlarged portions 83 and 31, respectively, of the elongated tubular members 80 and 30. Where desired, the hollow members 93 and 93' may be utilized for the purpose of supporting various operating parts and units such as for example the engine or power transmission mechanism accomodated within an engine compartment E.

The impact absorbing devices A and A' may be connected together by suitable cross members which are mechanically separate from the vehicle body B. These cross members are shown to include a panel 94 interconnecting the second elongated tubular members 81 and 32 at their enlarged portions 87 and 40 receiving the enlarged portions 86 and 41 of the cylinders 85 of the resilient units 82 and the third elongated tubular members 39, respectively, and a panel 95 interconnecting the cylinders 85 of the resilient units 82 and the third elongated tubular members 39 at their foremost ends. Where desired, a third panel 96 may be provided which interconnects the first elongated tubular members 80 and 30 at their enlarged portions 83 and 31, respectively, and the elongated hollow members 93 and 93'. The panels 94, 95 and 96 serve to prevent the individual component members of the impact absorbing devices A and A' from buckling when bending stresses are applied thereto and to transmit substantially equalized longitudinal forces to the component members of the impact absorbing devices A and A' when the devices are subjected to an impact. An example of a configuration of the panel 95 is illustrated in FIG. 17d.

Figure 17A:
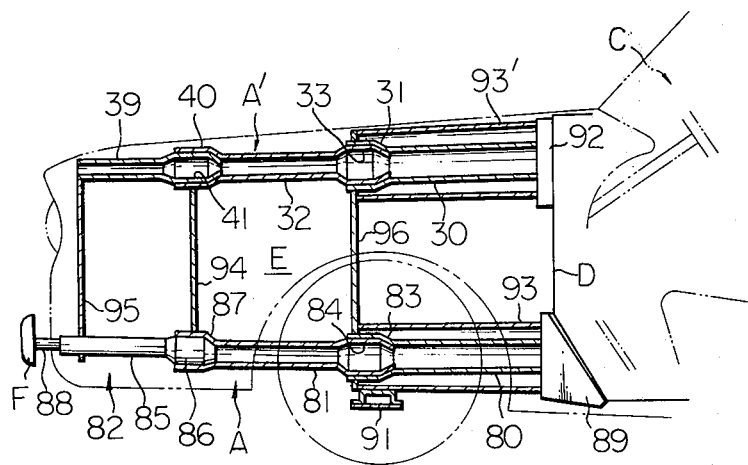
FIG. 17a is a longitudinal sectional view showing another form of vehicle body structure incorporating the impact absorbing devices embodying the present invention in an unactuated condition.
Figure 17B:
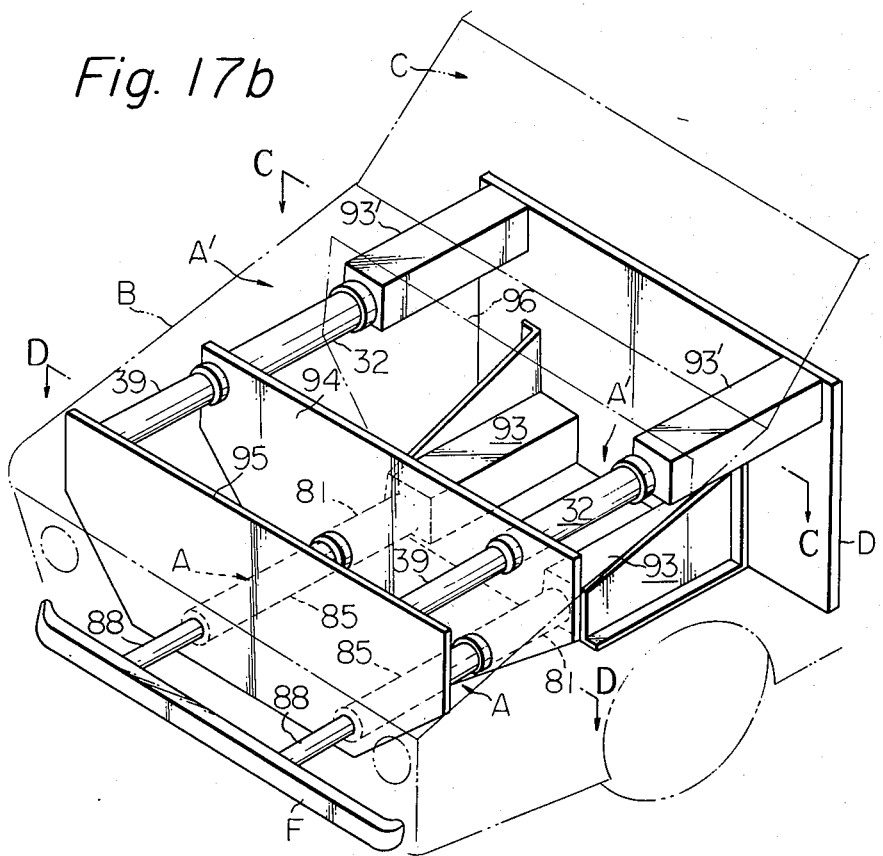
Figure 17C:
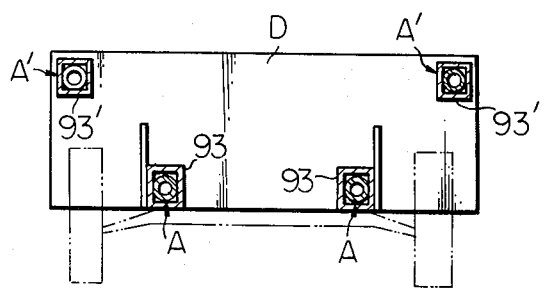
FIG. 17c is a cross sectional view taken on line C—C of FIG. 17b.

When, thus, the motor vehicle having an above described body structure encounters a frontal collision at its bumper F so that a force of impact is simultaneously exerted on the impact absorbing devices A and A' in the longitudinal directions, the piston rods 88 of the resilient units 82 of the impact absorbing devices A will be forced into the cylinders 85 against the fluid pressures therein with the result that the enrgy of impact is partly consumed by deformation of the resilient units 82. If, in this instance, the force of impact is lower than a predetermined value, the deformable tubular members making up the impact absorbing devices A and A' will remain in situ so that the piston rods 88 will be moved back to their initial positions by means of the fluid pressure in the cylinders 85 when the impact is cleared. If, however, the force of impact is greater than the predetermined value, the cylinders 85 of the devices A and the third elongated tubular members 39 of the devices A' will be longitudinally rammed into the second elongated tubular members 81 and 32 so that the second tubular members 81 and 32 are plastically deformed and expanded in cross section, shown in FIG. 17e. The energy of impact is thus consumed by plastic deformation of the second elongated tubular members 81 and 32 as the enlarged portions 86 and 41 of the cylinders 85 and the third tubular members 39 are forced into the second tubular members 81 and 32, respectively. If the energy of impact is completely absorbed at this stage of the collision condition, the first tubular members 80 and 30 and the elongated hollow members 93 and 93' will remain intact in the conditions illustrated in FIGS. 17a and 17e. If, however, the energy of impact remains unconsumed even after the second tubular members 81 and 32 have been deformed throughout their lengths, then the second tubular members 81 and 32 will be rammed into the first tubular members 80 and 30 so that the first tubular members are plastically deformed and expanded in cross section along their lengths as shown in FIG. 17f. The movement of the cylinders 85, the third tubular members 39 and second tubular members 81 and 32 will terminate when they are fully rammed into the first tubular members 80 and 30 because the first tubular members 80 and 30 are left with their lengths unchanged and by reason of the existence of the hollow members 93 and 93'. The engine and various component parts of the power transmission and suspension mechanisms accommodated within the vehicle body B will be in this manner protected from serious damage and from being moved into a vehicle passenger compartment C.

It will be appreciated that a vehicle body structure of the character above described has a collapsible front section made up of the second tubular members 81 and the resilient units 82 of the impact absorbing devices A and the second and third tubular members 32 and 39 of the impact absorbing devices A' and non-collapsible section made up of the first tubular members 80 and 30 of the impact absorbing devices A and A', respectively, and the hollow members 93 and 93'. While the collapsible and non-collapsible sections provide space for accommodating therein engine and other operational mechanisms during normal usage of the vehicle body structure, the collapsible section, serve to absorb energy of impact when the motor vehicle encounters a collision, and the non-collapsible sections serve to prevent the engine and other operational mechanisms from being seriously damaged and from being moved into the vehicle passenger compartment C.

Figure 18A:
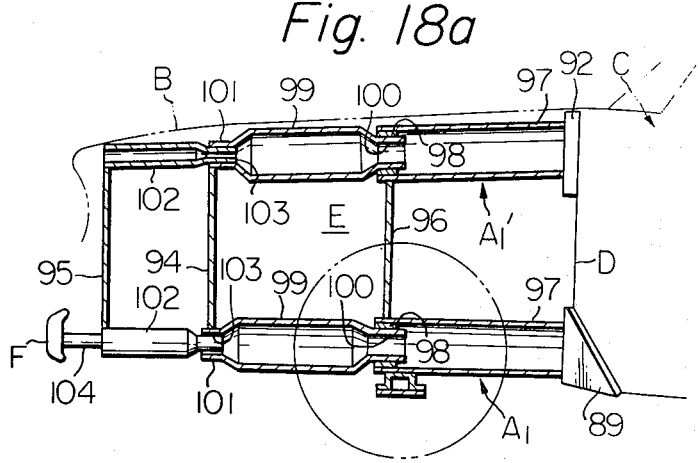
FIG. 18a is a longitudinal sectional view showing still another form of motor vehicle body structure incorporating impact absorbing devices embodying the present invention.
Figure 18B:
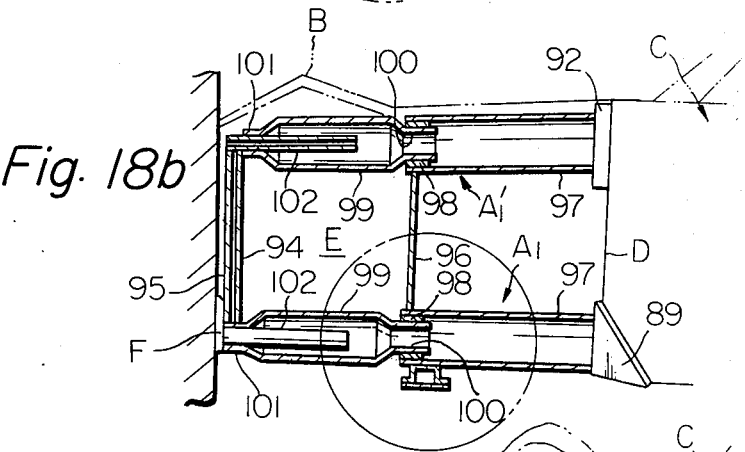
FIG. 18b is a view similar to FIG. 18a showing the vehicle body structure in a partially collapsed condition.
Figure 18C:
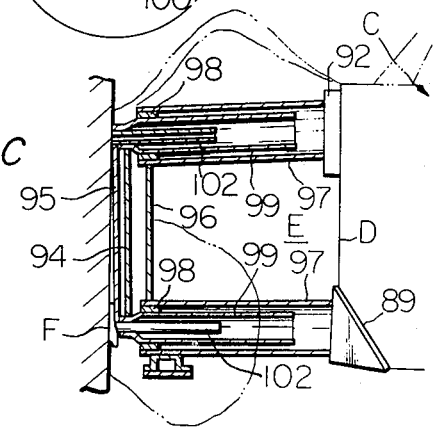
FIG. 18c is a view also similar to FIG. 18a illustrating the vehicle body structure in a fully collapsed condition.
Figure 19A:
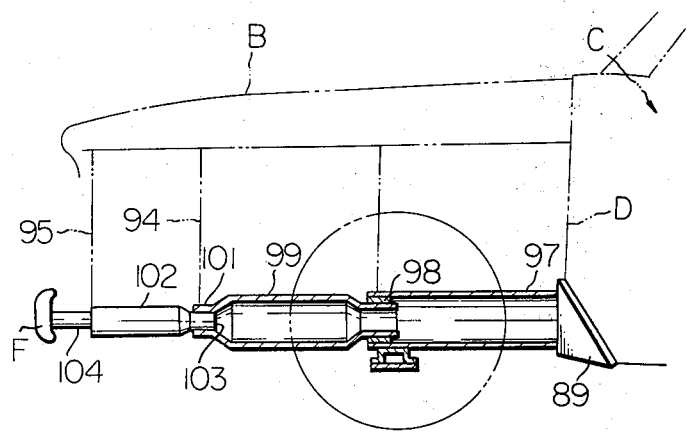
FIG. 19a is a longitudinal sectional view showing still another form of motor vehicle body structure incorporating impact absorbing devices embodying the present invention.
Figure 19B:
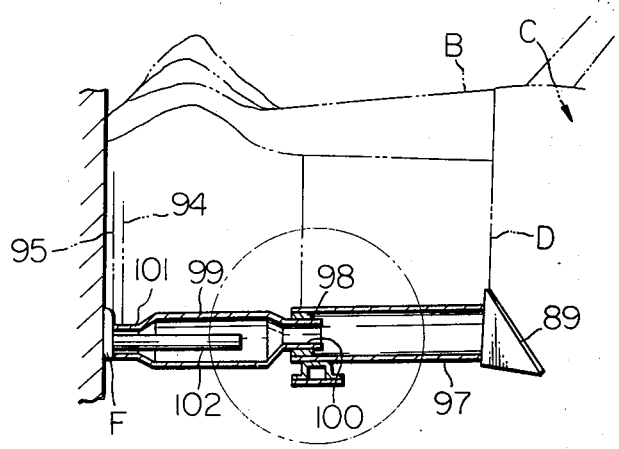
FIG. 19b is a view similar to FIG. 19a showing the vehicle body structure in a partially collapsed condition.
Figure 19C:
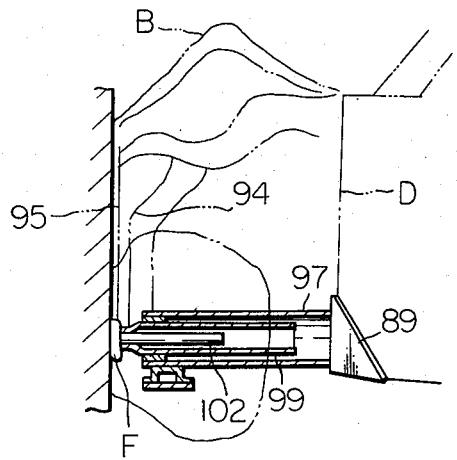
FIG. 19c is also similar to FIG. 19a showing the vehicle body structure in a fully collapsed condition.

A modification of a vehicle body structure of the configuration above described is now illustrated in FIGS. 18a to 18c. The vehicle body structure herein shown uses a pair of lower impact absorbing devices $A_1$ and a pair of upper impact absorbing devices $A_1'$. Each of the impact absorbing devices $A_1$ and $A_1'$ comprises a first elongated tubular member 97 having a reduced front end portion 98, a second elongated tubular 99 having reduced profile end portions 100 and 101 and a third elongated tubular member 102 having a reduced profile end portion 103. The reduced profile end portion 98 of the first tubular member 97 tightly receives therein the reduced profile end portion 100 of the second tubular member 99 while the reduced profile end portion 101 of the second tubular member 99 tightly receives therein the reduced profile end portion 103 of the third tubular member 102 whereby the third and second tubular members 102 and 99 are respectively telescopically connected to the second and first tubular members 99 and 97, respectively. The lower impact absorbing devices $A_1$ have their first tubular members 97 rigidly connected at their rear ends either directly or through a mounting place or plates 89 to a dashboard D and have their third tubular members 102 connected through rods 104 to a bumper F. The impact absorbing devices $A_1'$, on the other hand, have their first tubular members 97 rigidly connected at their rear either directly or through a mounting plate or plates 92 to an upper part of the dashboard D and their third tubular members 102 terminating near the foremost end of the vehicle body B. The second tubular members 99 are all connected together at their reduced profile end portions 101 by a rigid panel 94 while the third tubular members 102 are connected together at their front end portions by a rigid panel 95. Where desired, the first tubular members 97 may likewise be interconnected at their reduced front ends 98 by a rigid panel 96. These panesl 94, 95 and 96 are positioned transversely to the tubular members of the impact absorbing devices $A_1$ and $A_1'$ and are normally mechanically separate from the vehicle body B. While the deformable members of the impact absorbing devices used in the vehicle body structure shown in FIGS. 17a to 17f are adapted to be expanded in cross section, those of the devices $A_1$ and $A_1'$ are adapted to be compressed or reduced in cross section as shown in FIGS. 18b and 18c when subjected to an impact with a force greater than the elastic limits of the deformable members. As shown in FIGS. 18b and 18c, only the second and third tubular members 99 and 102 are compressed or plastically deformed as the third and second tubular members 102 and 99 are rammed into the second and first tubular members 99 and 97 respectively. The first tubular members 97 thus remain intact while the third and second tubular members 102 and 99 are fully collapsed therein so that the collapsion of the vehicle body B is terminated when the third and second tubular members 102 and 99 are deformed throughout their lengths as shwon in FIG. 18c. The engine and other operational mechanisms accommodated within an engine compartment E defined by the vehicle body B can be prevented from being seriously damaged and from being moved into a vehicle passenger compartment C during a collision condition of the motor vehicle.

Where desired, the upper impact absorbing devices $A_1'$ may be omitted from the vehicle body structure above described so that the body structure comprises a pair of lower impact absorbing devices $A_1$ as illustrated in FIG. 19a. A vehicle body structure of this nature will be collapsed in a manner illustrated in FIGS. 19b and 19c when subjected to a force of impact in its longitudinal direction similar to that of the vehicle body structure illustrated in FIGS. 18a to 18c.

Figure 20:
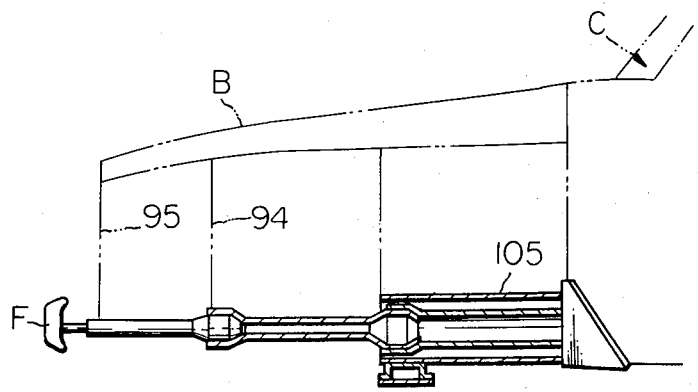
FIG. 20 is a longitudinal sectional view showing still another form of motor vehicle body structure incorporating impact absorbing devices embodying the present invention.

FIG. 20 illustrates a modification of a vehicle body structure illustrated in FIGS. 16a to 16d. As an alternative to hollow collapsible members 93 and 93' incorporated in a vehicle body structure of FIGS. 16a to 16d, the vehicle body structure herein shown includes hollow members 105 which are rigidly connected at their rear ends either directly or through the mounting plate or plates 89 to a dashboard D and which have their front ends transmitting at the enlarged front end portions 83 of the first elongated tubular members 80. A vehicle body structure of this nature provides a collapsible section made up of the second elongated tubular 81 and the resilient units 82, and a non-collapsible section made up of the first elongated tubular members 80 and the elongated hollow members 105 enclosing the first tubular members substantially along their lengths.

What is claimed is:

1. An impact absorbing device comprising a first elongated tubular member having a first end portion which has at least one enlarged portion, the cross sectional shape of said at least one enlarged portion of said first end portion being substantially the same as that of the remainder of said first elongated tubular member; and a second elongated tubular member having a second end portion which has at least one second enlarged portion, the cross sectional shape of said at least one second enlarged portion of said second end portion being substantially the same as that of the said remainder of said second elongated tubular member, the cross sectional area of said at least one enlarged portion of said second end portion being larger than that of the said remainder of said first elongated tubular member, said second elongated tubular member being in coaxial alignment with said first elongated tubular member and telescopically connected with said first elongated tubular member with said second end portion received by surface-to-surface engagement in said first end portion, said first elongated tubular member being made of a relatively malleable material.

2. An impact absorbing device as claimed in claim 1, in which said first and second end portions are tapered in the direction of travel of said second elongated tubular member relative to said first elongated tubular member.

3. An impact absorbing device as claimed in claim 1, in which said at least one enlarged portion of said first end portion and said at least one enlarged portion of said second end portion are rounded in profile.

4. An impact absorbing device as claimed in claim 3, and further comprising reinforcement members for reinforcing said at least one enlarged portion of said second end portion.

5. An impact absorbing device as claimed in claim 3, in which said first end portion has two such enlarged portions and said second end portion has two such enlarged portions, the two enlarged portions of said first end portions being longitudinally spaced from each other and having substantially the same cross sectional area, the two enlarged portions of said second end portion being longitudinally spaced from each other and having substantially the same cross sectional area.

6. An impact absorbing device as claimed in claim 1, in which said second end portion has two enlarged portions longitudinally spaced from each other and received in contact with an enlarged portion of said first end portion.

7. An impact absorbing device as claimed in claim 6, in which said two enlarged end portions of said second end portion have substantially the same cross sectional area.

8. An impact absorbing device as claimed in claim 6, in which the inner of said two enlarged portions of said second end portion of said second elongated tubular member has a larger cross sectional area than the outer of said two enlarged portions.

9. An impact absorbing device as claimed in claim 1, further comprising a third elongated tubular member made of less malleable material than said second elongated tubular member, said second elongated tubular member having a third end portion opposite said second end portion, said third end portion having an enlarged portion the cross sectional shape of which is substantially the same as that of the enlarged portion of said second end portion, and said third elongated tubular member has a fourth end portion, said fourth end portion having an enlarged portion the cross sectional shape of which is substantially the same as that of said second elongated tubular member, the cross sectional area of said enlarged portion of said fourth end portion being larger than that of said second elongated tubular member, said third elongated tubular member being in coaxial alignment with said second elongated tubular member and telescopically connected with said second elongated tubular member, said fourth end portion being received by surface-to-surface engagement in said third end portion.

10. An impact absorbing device as claimed in claim 9, and further comprising a plurality of rupturable pins passing through said first and second elongated tubular members adjacent said first and second end portions and through said second and third elongated tubular members adjacent said third and fourth end portions, respectively.

11. An impact absorbing device as claimed in claim 9, further comprising means for urging said first, second and third elongated tubular members longitudinally toward each other.

12. In a motor vehicle having a rigid member stationarily fixed relative to a passenger compartment when there is a collision of the motor vehicle: a plurality of elongated hollow members connected at one end with said rigid member and extending in fore-and-aft direction therefrom; a corresponding number of first elongated deformable tubular members positioned within said fixed elongated hollow members respectively, said first elongated deformable tubular members connected at one end thereof with said rigid member and having free ends; a corresponding number of second elongated deformable tubular members; a corresponding number first means for deforming said first elongated deformable tubular means upon motion of said second elongated deformable tubular members relative to said first elongated deformable tubular members, said second elongated deformable tubular members being telescopically connected with said first elongated tubular members by said first deforming means respectively; a first cross panel interconnecting said fixed elongated hollow members and said free ends; a corresponding number of third elongated members; a corresponding number of second means for deforming said second deformable tubular members upon motion of said third elongated members relative to said second elongated deformable tubular members, said third elongated members being telescopically connected with said second elongated tubular members by said second deforming means respectively; and a second cross panel interconnecting said second elongated deformable tubular members.

13. In a motor vehicle having a rigid member stationarily fixed relative to a passenger compartment when there is a collision of the motor vehicle: a plurality of elongated hollow members connected at one end thereof with said rigid member and having free ends and extending in fore-and-aft direction of the motor vehicle; a first panel interconnecting said free ends of said elongated hollow members; a corresponding number of first elongated deformable tubular members; a corresponding number of first means for deforming said first elongated deformable tubular members upon motion of said first deformable members relative to said elongated hollow members, said first elongated deformable tubular members being teslescopically connected with said elongated hollow members by said first deforming means; a second cross panel interconnecting said first elongated deformable tubular members; a corresponding number of second elongated deformable members; and a corresponding number of second means for deforming said second elongated deformable members upon motion of said second elongated deformable members relative to said first elongated deformable tubular members, said second elongated deformable members being telescopically connected with said first deformable tubular members by said second deforming means respectively.

* * * * *